(12) United States Patent
Pilcher et al.

(10) Patent No.: US 7,103,175 B2
(45) Date of Patent: Sep. 5, 2006

(54) SYSTEMS AND METHODS FOR AN ELECTRONIC HOOK SWITCH FOR CUSTOMER PREMISES EQUIPMENT

(75) Inventors: Ngai Kwok Hing Pilcher, Hong Kong (HK); Wai-Hung Leung, Hong Kong (HK)

(73) Assignee: VTech Telecommunications Limited, Tai Po (HK)

( * ) Notice: Subject to any disclaimer, the term of this patent is extended or adjusted under 35 U.S.C. 154(b) by 265 days.

(21) Appl. No.: 10/400,648

(22) Filed: Mar. 28, 2003

(65) Prior Publication Data

US 2004/0131176 A1    Jul. 8, 2004

Related U.S. Application Data

(60) Provisional application No. 60/438,532, filed on Jan. 8, 2003.

(51) Int. Cl.
  H04M 1/00    (2006.01)
  H04M 9/00    (2006.01)
(52) U.S. Cl. .................. 379/382; 379/380; 379/399.01
(58) Field of Classification Search ................ 379/382, 379/399.01–413.04
  See application file for complete search history.

(56) References Cited

U.S. PATENT DOCUMENTS 4,465,903 A * 8/1984 Barber .................... 379/93.05
5,553,138 A * 9/1996 Heald et al. ................ 379/413
5,768,364 A * 6/1998 Karnowski et al. .... 379/388.02
5,946,394 A * 8/1999 Gambuzza ............. 379/399.01

FOREIGN PATENT DOCUMENTS

| EP | 0 651 540 | 5/1995 |
| WO | WO 86/07659 | 12/1986 |
| WO | WO 8607659 | * 12/1986 |

OTHER PUBLICATIONS

GB Search Report dated May 20, 2004.

* cited by examiner

*Primary Examiner*—Fan Tsang
*Assistant Examiner*—Ramnandan Singh
(74) *Attorney, Agent, or Firm*—Pillsbury Winthrop Shaw Pittman LLP

(57) ABSTRACT

Embodiments of the present invention relate to systems and methods for an electronic hook switch for customer premises equipment. In an embodiment, a system includes a first lead configured to be coupled to a tip wire and a second lead configured to be coupled to a ring wire. A diode bridge is coupled to the first lead and the second lead and has a positive output. A low side switch is coupled to the positive output of the diode bridge without a high side switch between the low side switch and the positive output of the diode bridge.

19 Claims, 4 Drawing Sheets

SYSTEMS AND METHODS FOR AN ELECTRONIC HOOK SWITCH FOR CUSTOMER PREMISES EQUIPMENT

CROSS-REFERENCE TO RELATED APPLICATION

This application claims the benefit of U.S. Provisional Patent Application Ser. No. 60/438,532 filed Jan. 8, 2003, which is herein incorporated by reference in its entirety.

BACKGROUND OF THE INVENTION

1. Field of the Invention

Embodiments of the present invention relate to customer premises equipment. More particularly, embodiments of the present invention relate to systems and methods for an electronic hook switch for customer premises equipment.

2. Background Information

While telephone infrastructure varies from country to country, the United States infrastructure provides a useful starting point for purposes of describing background information and embodiments of the present invention. Naturally, the embodiments described herein are useful in other contexts. In the United States, a landline phone can be a cordless or corded telephone that is coupled to a central office ("CO") of a local exchange carrier ("LEC") such as a Regional Bell Operating Company ("RBOC"), a competitive local exchange carrier ("CLEC"), and so on. Cordless telephones have no cord between the handset and base, each of which have a radio transmitter, receiver and antenna for communications between the handset and base. Typically, the handset includes a rechargeable battery, and the base is powered by current from an alternating current ("AC") outlet (e.g., of a house, office, etc.). The range of effective communications between the handset and base can be from 10 feet to several miles depending on factors such as product design, operating radio frequency(s), environmental conditions, and legal restrictions (e.g., laws, regulations, etc.). Examples of known operating radio frequencies for cordless telephone communications in the United States include 900 Megahertz ("MHz"), 2.4 Gigahertz ("GHz"), 5.8 GHz, a combination thereof, and so on.

In a residential environment, the base is typically coupled to the CO via one or more wires, such as an RJ-11 wire that couples the base to an RJ-11 jack on a wall or in a floor. The RJ-11 jack is typically coupled to the CO via a twisted-pair wire. The CO can provide voltage and current to a telephone coupled to the CO via the RJ-11 wire and the RJ-11 jack. For example, known corded phones draw power from the CO during telephone call dialing and during the telephone call. Each RJ-11 jack usually has four wires, which consist of two sets of a tip and ring pair. A single-line corded phone is typically coupled to one set of a tip and ring pair (and can draw power from that tip and ring pair), and a two-line corded phone is typically coupled to each of the two sets of the tip and ring pairs (and can draw power from either or both tip and ring pair).

As used to describe the background and embodiments of the present invention, the term "coupled" encompasses a direct connection, an indirect connection, or a combination thereof. Two devices that are coupled can engage in direct communications, in indirect communications, or a combination thereof. Moreover, two devices that are coupled need not be in continuous communication, but can be in communication typically, periodically, intermittently, sporadically, occasionally, and so on. Further, the term "communication" is not limited to direct communication, but also includes indirect communication.

Cordless phones typically do not draw power from the tip and ring pairs because the cordless phone base is powered by current from an AC outlet. Cordless phones, however, are still connected to one or more of the tip and ring pairs to transmit and receive voice and data communication signals. Moreover, a cordless phone base includes electronic circuitry that is powered at a relatively low voltage as compared to the voltages associated with a tip and ring pair. For example, electronic circuitry is often powered at 12 volts, 5 volts, 3.3 volts, and so on. In contrast, voltages associated with a tip and ring pair can be as high as 350 volts.

In known telephones, an electronic hook switch consists of a high side switch and a low side switch, so that a low voltage control integrated circuit ("IC") (e.g., a microcomputer unit, a dialer IC, a specific controller, etc.) can control the electronic hook switch notwithstanding the high voltage between tip and ring. In such known systems, whether or not they are constructed using bipolar transistors or MOSFETs, neither the high side switch nor the low side switch is omitted. Because these systems have both a high side switch and low side switch, there are disadvantageous cost and system design implications.

For example, known customer premises equipment ("CPE"), such as a telephone, usually employs two Darlington connected PNP transistors to build the high side switch and have one NPN transistor for the low side switch. If P-channel MOSFET is used for the high side switch, an N-channel MOSFET is required for the low side switch to translate the line voltage level to a voltage low enough to interface with the control circuit. Often, each of the low side switch and the high side switch have to withstand voltages as high as 350 volts. In view of the foregoing, it can be appreciated that a substantial need exists for systems and methods that can advantageously provide for an electronic hook switch for customer premises equipment.

BRIEF SUMMARY OF THE INVENTION

Embodiments of the present invention relate to systems and methods for an electronic hook switch for customer premises equipment. In an embodiment, a system includes a first lead configured to be coupled to a tip wire and a second lead configured to be coupled to a ring wire. A diode bridge is coupled to the first lead and the second lead and has a positive output. A low side switch is coupled to the positive output of the diode bridge without a high side switch between the low side switch and the positive output of the diode bridge.

Figure 1:
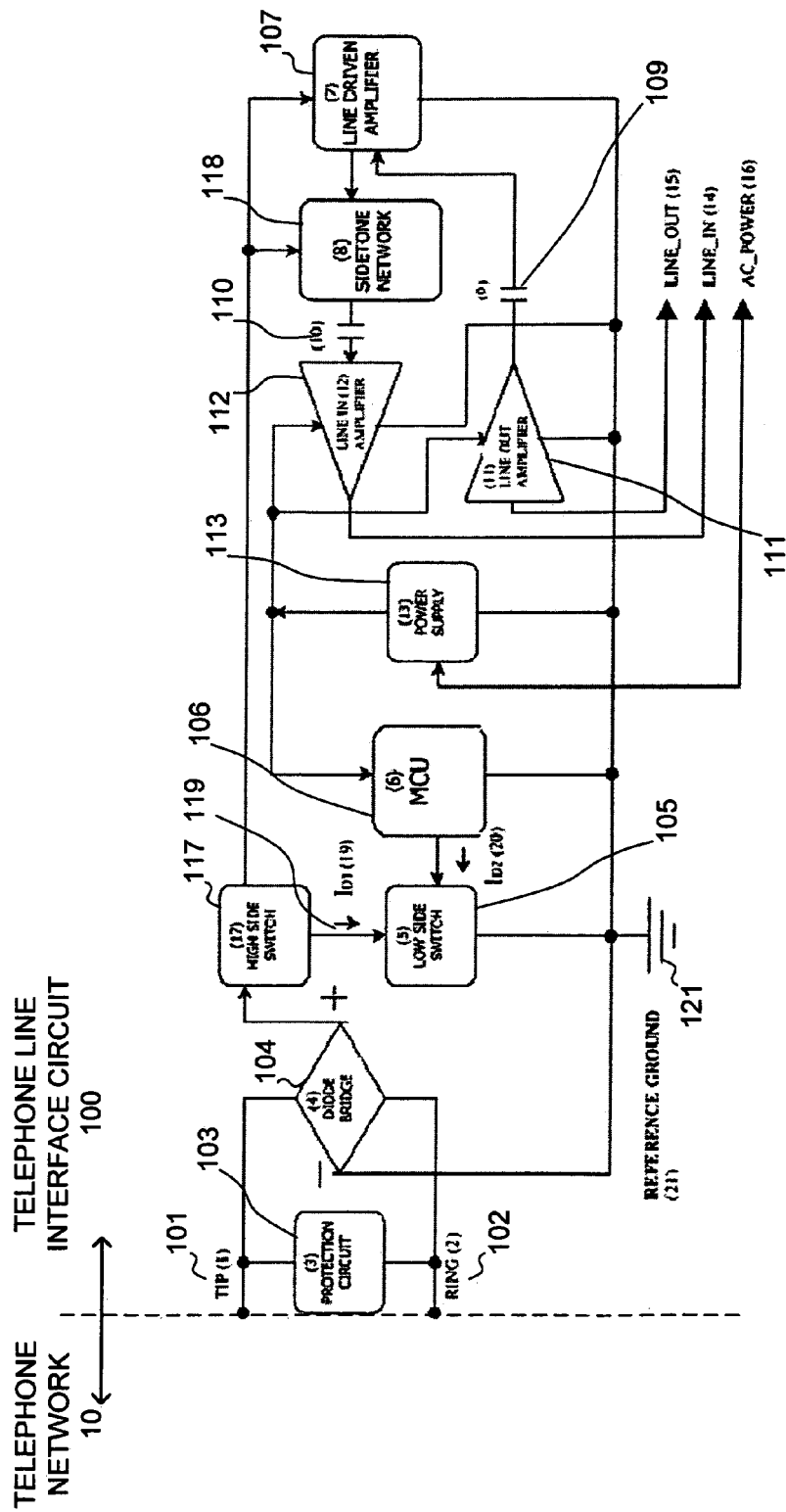
FIG. 1 shows an example of a known telephone line interface circuit.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

According to an embodiment of the present invention, a telephone system includes a telephone line interface circuit that avoids the use of the high side switch in an electronic hook switch circuit. The electronic hook switch can then consist of an NPN transistor or N-channel MOSFET. As a result, space and cost is saved. Because a telephone line interface circuit can be constructed with fewer components, a printed circuit board ("PCB") or integrated circuit including the electronic hook switch can be of reduced size. Thus, a telephone system (e.g., a cordless telephone base) can be produced and sold at a lower price.

FIG. 1 shows the block diagram of an example of a known telephone line interface circuit 100. Telephone network 10 is connected to tip 101 and ring 102. Protection circuit 103 avoids over voltage damage to the subsequent circuit and diode bridge 104 regulates the line DC voltage to a fix polarity for the remainder of the telephone line interface circuit 100. If the Microcomputer Unit (MCU) 106 drives the low side switch 105 to on, current ID1 119 will flow and turn on the high side switch 117. Then the loop is closed and the loop current will pass through the high side switch 117 and the circuitry behind it. This status is usually called an off-hook condition. In contrast to this off-hook status, if the MCU 106 drives the low side switch 105 to off, current ID1 119 will no longer flow and the high side switch 117 will be off. As a result, the loop is open and no loop current will flow into the circuitry behind the high side switch 1117. This known telephone interface circuit 100 and its operations are representative of how a typical known electronic hook switch is constructed and operates.

The open loop voltage on the line can be as high as 350 volts. The MCU 106 cannot directly drive the high side switch 117 because it is a low voltage device and cannot withstand a voltage as high as 350 volts. While it is in an off-hook condition, the signal coming in will be extracted by the passive side tone network 108 and amplified by the line in amplifier 112. Out going signal is amplified by the line out amplifier 111 and fed into the line through the line driven amplifier 107. With respect to the flow of the loop current, it passes through the high side switch 117 and the line driven amplifier 107 and back to the telephone network 10. Circuit elements such as the line in amplifier 112, line out amplifier 111 and the MCU 106 typically need an auxiliary power supply. In some known systems, these circuit elements draw power directly from the telephone network 10, as is the case in a typical corded phone. Usually, no matter where the power comes from, the power supply circuit 113 will have the same reference ground 121 as the MCU 106, the low side switch 105 and the amplifier circuit elements 111, 112, and 107. This is usually required to use an auxiliary power supply and set up a normal signal path. Typically, the reference ground 121 of the telephone line interface circuit 100 is at the negative output of the diode bridge 104.

Figure 2:
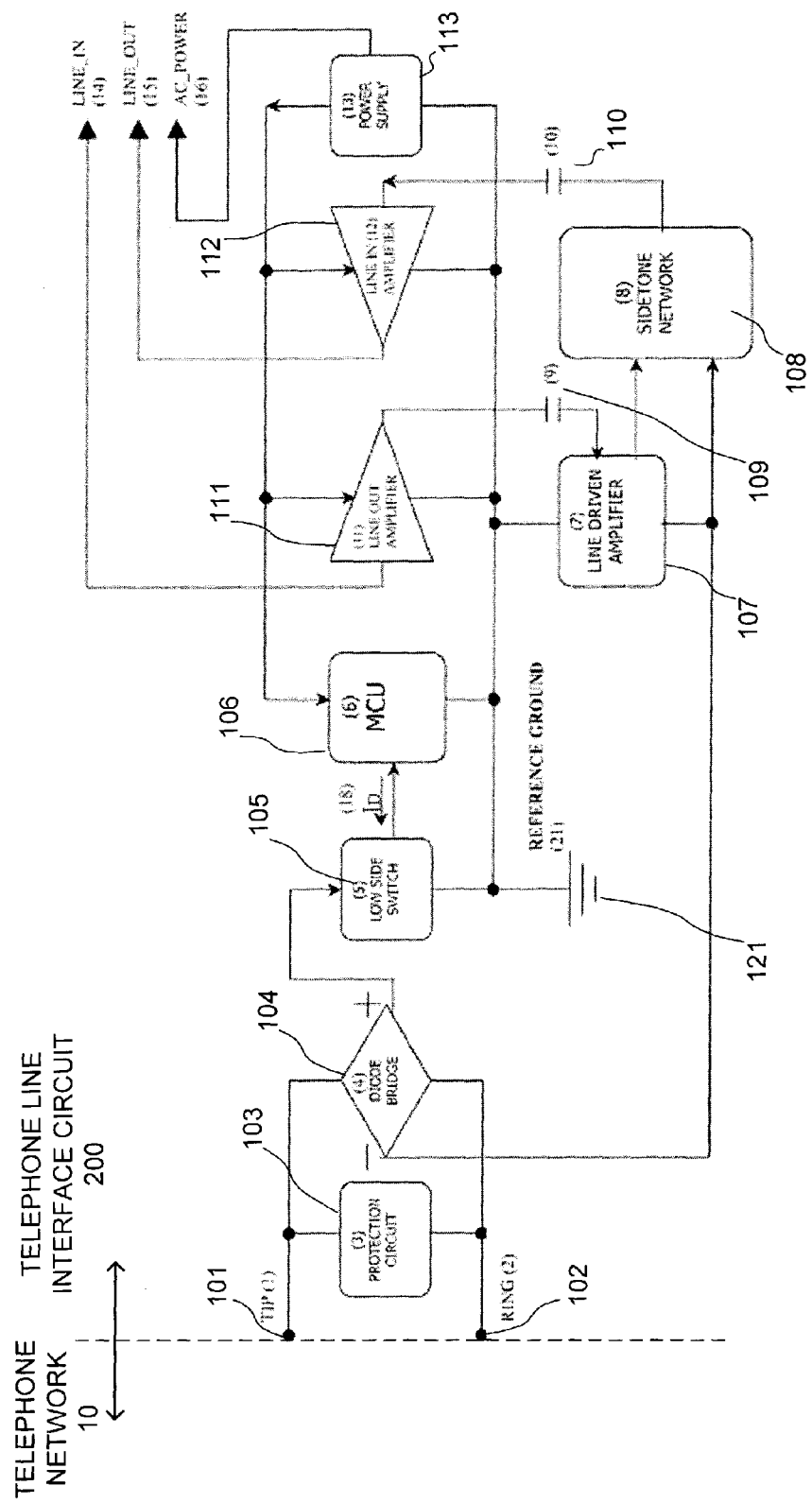
FIG. 2 is a system diagram of a telephone line interface circuit in accordance with an embodiment of the present invention.

FIG. 2 is a system diagram of a telephone line interface circuit in accordance with an embodiment of the present invention. In an embodiment of the present invention, an improved telephone line interface circuit 200 does not include the high side switch present in known telephone line interface circuits. For example, telephone line interface circuit 200, as compared to the known telephone line interface circuit 100, includes all the circuit elements of telephone line interface circuit 100 except the high side switch 117. Moreover, in an embodiment, the interconnections between the circuit elements of telephone line interface circuit 200 remain substantially the same as the interconnections between the circuit elements of known telephone line interface circuit 100. Furthermore, in an embodiment, each of the circuit elements of circuit 200 can have same internal design as the corresponding circuit elements in known circuit 100. According to an embodiment of the present invention, the only changes reflected in circuit 200 as compared to known circuit 100 is that the low side switch 105 is coupled to the positive output of the diode bridge 104, and the line driven amplifier 107 is coupled to the negative output of the diode bridge 104. Also, the reference ground 121 is not at the negative output of the diode bridge. In telephone line interface circuit 200, the loop current passes through the low side switch 105 and the line driven amplifier 107 and back to the telephone network 10 in an off-hook state. In an embodiment, the line driven amplifier is biased by a negative voltage, which can be accomplished a variety of ways. By way of example, for a bipolar solution, the NPN transistor is changed to PNP transistor or vice-versa. The AC signal is coupled by capacitors 109, 110. The voltage across these capacitors 109, 110 can increase a few volts because they now block the DC biasing between the negative voltage operated circuit elements 107, 108 and the positive voltage operated circuit elements 106, 111, and 112. In other embodiments of the present invention, however, a low voltage capacitor still can be used.

Figure 3:
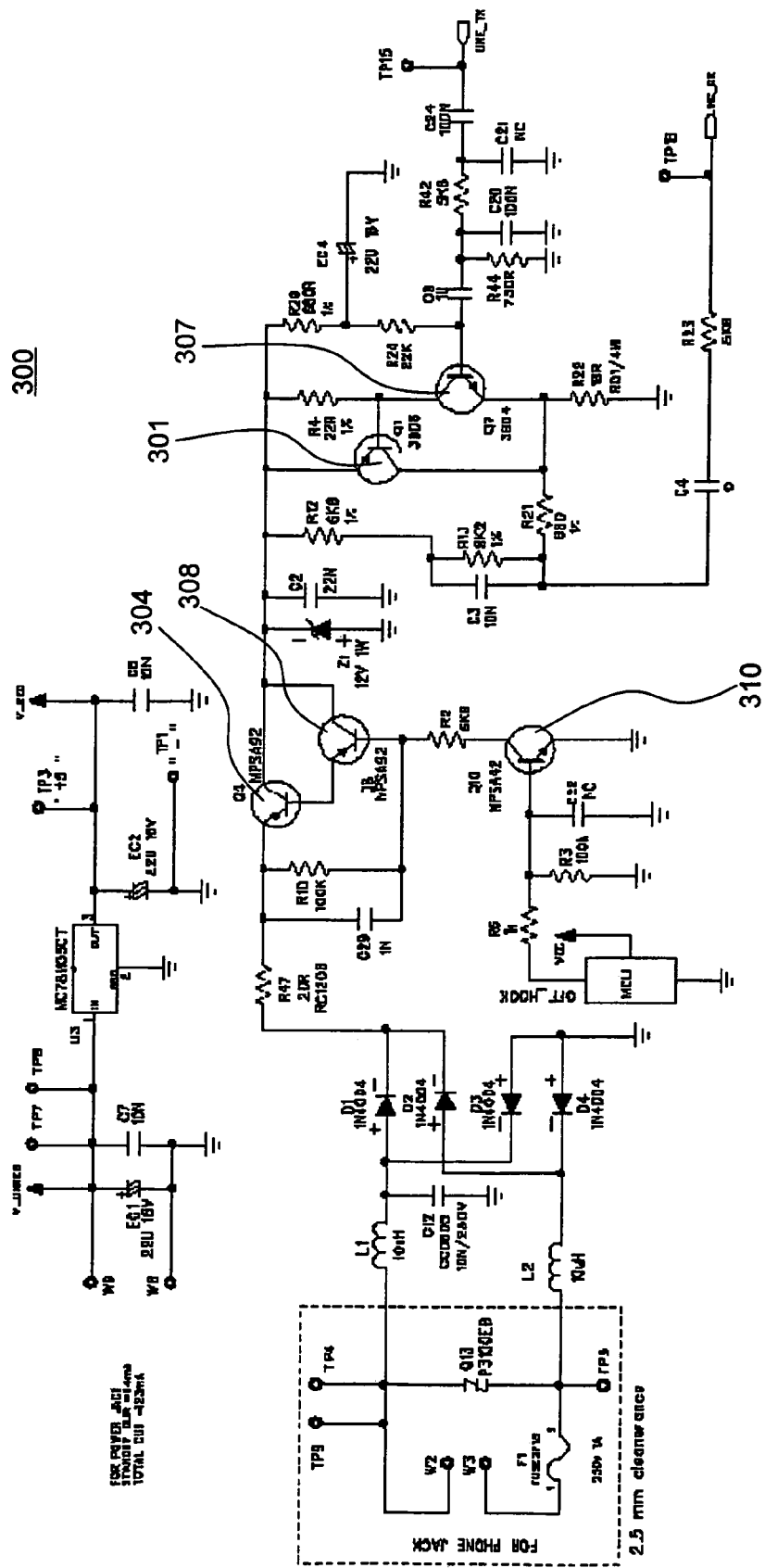
FIG. 3 shows an example of a known telephone interface circuit design.

FIG. 3 shows an example of a known telephone interface circuit design 300. The high side switch is formed by the transistors 304 and 308. The low side switch is formed by transistor 310, and the line driven amplifier is formed by transistors 301 and 307. One skilled in the art will appreciate that the current that drives the high side switch is part of the loop current, and that current cannot be set too high otherwise the off-hook DC V-I characteristic may be violated. The current, however, must be large enough to drive the high side switch into saturation. An undesirable condition occurs when the voltage between tip and ring is very low, which can be caused by a parallel phone. Thus, known circuits use a low driven current and a high gain transistor to construct the high side switch. Unfortunately, a high voltage PNP transistor usually has low current gain. As a result, two PNP transistors in Darlington configuration are typically employed to form the switch with enough current gain.

Figure 4:
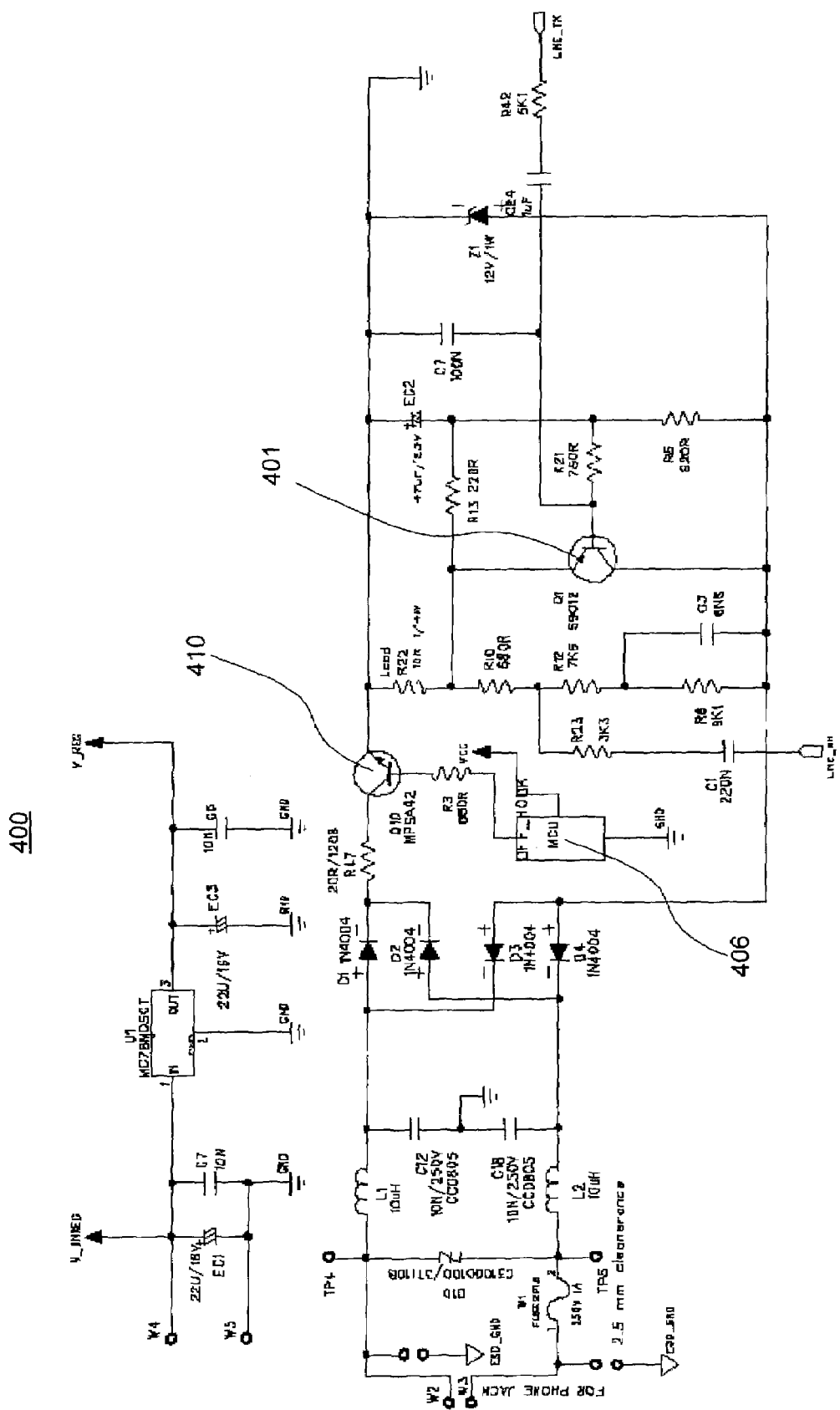
FIG. 4 is a system diagram of a telephone interface circuit design in accordance with an embodiment of the present invention.

FIG. 4 is a system diagram of a telephone interface circuit design 400 in accordance with an embodiment of the present invention. As compared to known circuit design 300, circuit design 400 lacks the two high voltage PNP transistors (i.e., transistors 304, 308) and high voltage NPN transistor 410 acts as the low side switch. One skilled in the art will appreciate that the current driving transistor 410 is not part of the loop current, but rather comes from the MCU 406 and thus is from the auxiliary power supply. In an embodiment, this is advantageous because the magnitude of the driving current does not affect the DC V-I characteristic, provided that the driving current is high enough to drive the transistor to saturation. Thus, in an embodiment, a high driving current can drive the switch without concerning violating the off-hook DC V-I characteristic and only one NPN transistor is used in the low side switch.

In the above example of circuit design 400, as compared to known circuit design 300, two high voltage PNP transistor are not used and thereby from a manufacturing and cost standpoint are "saved." Embodiments of the present invention, such as circuit design 400, have demonstrated that there is little or no impact on the high voltage protection circuit and the whole design passes the UL and FCC part 68 tests.

Embodiments of the present invention encompass not only telephones but also other Customer Premises Equipment (CPE) that is coupled to the telephone network, such as, but not limited to, answering machines, fax machines, computer modems, and so on. Embodiment of the present invention can be implemented in these CPE and can help reduce production costs. For example, in the example of an integrated circuit that includes a telephone line interface circuit, embodiments of the present invention can reduce chip size and thus the cost of the chip.

Embodiments of systems and methods for an electronic hook switch for customer premises equipment have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, systems and methods in accordance with embodiments of the present invention have been described with reference to specific exemplary embodiments. Accordingly, the present specification and figures are to be regarded as illustrative rather than restrictive. The scope of the invention is to be defined by the claims appended hereto, and by their equivalents.

What is claimed is:

1. A system for an electronic hook switch for customer premises equipment, the system comprising:
    a first lead configured to be coupled to a tip wire;
    a second lead configured to be coupled to a ring wire;
    a diode bridge coupled to the first lead and the second lead, the diode bridge having a positive output and a negative output;
    a low side switch coupled to the positive output of the diode bridge without a high side switch between the low side switch and the positive output of the diode bridge: and
    a line driven amplifier coupled to the negative output of the diode bridge.

2. The system of claim 1, wherein the first lead and the second lead are coupled to a protection circuit.

3. The system of claim 1, further comprising a sidetone network coupled to the negative output of the diode bridge.

4. The system of claim 3, wherein the sidetone network is coupled to the line-in amplifier.

5. The system of claim 4, wherein the negative output of the diode bridge is coupled to an input of the sidetone network, and an output of the sidetone network is coupled to the line-in amplifier.

6. The system of claim 1, wherein the low side switch is coupled to a reference ground.

7. The system of claim 1, wherein the low side switch is coupled to a microcomputer unit.

8. The system of claim 7, wherein the microcomputer is coupled to a power supply.

9. The system of claim 1, wherein the low side switch is coupled to a microcomputer unit and a power supply via a reference ground, and an input of the microcomputer unit is coupled to an output of the power supply.

10. A system for an electronic hook switch for customer premises equipment, the system comprising:
    a protection circuit coupled to a first lead and a second lead;
    a diode bridge coupled to the first lead and the second lead, the diode bridge having a positive output and a negative output;
    a low side switch essentially directly coupled to the positive output of the diode bridge without a high side switch between the low side switch and the positive output of the diode bridge;
    a line driven amplifier coupled with the negative output of the diode bridge.

11. The system of claim 10, wherein the first lead is configured to be coupled to a tip wire and the second lead is configured to be coupled to a ring wire.

12. The system of claim 10, wherein the low side switch being essentially directly coupled to the positive output of the diode bridge includes the low side switch coupled to the positive output of the diode bridge without a high side switch between the low side switch and the positive output of the diode bridge.

13. The system of claim 10, further comprising a sidetone network, wherein an input of the sidetone network is coupled to the negative output of the diode bridge and an output of the sidetone network is coupled to the line driven amplifier.

14. The system of claim 13, further comprising a microcomputer unit and a power supply, the low side switch coupled to the microcomputer and the power supply via a reference ground.

15. The system of claim 14, wherein line driven amplifier is coupled to the reference ground.

16. The system of claim 14, wherein an input to the microcomputer unit is coupled to an output of the power supply.

17. The system of claim 14, further comprising a line out amplifier and a line in amplifier, the reference ground coupled to the line out amplifier and the line in amplifier.

18. A system for an electronic hook switch for customer premises equipment, the system comprising:
    a protection circuit means coupled to a first lead and a second lead;
    a diode bridge means coupled to the first lead and the second lead, the diode bridge means having a positive output and a negative output;
    a low side switch means essentially directly coupled to the positive output of the diode bridge means without a high side switch between the low side switch and the positive output of the diode bridge;
    a line driven amplifier coupled to the negative output of the diode bridge; and
    a sidestone network of which an input is coupled to the negative output of the diode bridge and an output is coupled to the line driven amplifier.

19. The system of claim 18, wherein the low side switch means essentially directly coupled to the positive output of the diode bridge means includes the low side switch means coupled to the positive output of the diode bridge means without a high side switch between the low side switch means and the positive output of the diode bridge means.

* * * * *